United States Patent
Mathison et al.

(10) Patent No.: US 8,897,218 B2
(45) Date of Patent: Nov. 25, 2014

(54) FEMTOCELL LOCATION ENCODING

(75) Inventors: James Mathison, Warren, NJ (US); Said Hanbaly, Annandale, NJ (US); Mingxing Li, San Jose, CA (US); Raymond So, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 294 days.

(21) Appl. No.: 13/174,586

(22) Filed: Jun. 30, 2011

(65) Prior Publication Data

US 2012/0093077 A1 Apr. 19, 2012

Related U.S. Application Data

(63) Continuation-in-part of application No. 12/906,484, filed on Oct. 18, 2010.

(51) Int. Cl.
*H04W 4/00* (2009.01)
*H04W 76/02* (2009.01)
*H04W 4/20* (2009.01)
*H04W 76/00* (2009.01)
*H04W 4/02* (2009.01)
*H04W 84/04* (2009.01)

(52) U.S. Cl.
CPC .............. *H04W 4/20* (2013.01); *H04W 76/02* (2013.01); *H04W 4/001* (2013.01); *H04W 76/007* (2013.01); *H04W 4/02* (2013.01); *H04W 84/045* (2013.01)
USPC ........................................... 370/328

(58) Field of Classification Search
CPC ........ H04L 29/06; H04W 4/02; H04W 60/04; H04W 64/00; H04W 76/007; H04W 80/04; H04W 84/045; H04W 84/18; H04W 88/06; H04W 88/08
See application file for complete search history.

(56) References Cited

U.S. PATENT DOCUMENTS

| | | | |
|---|---|---|---|
| 2005/0233749 A1 | 10/2005 | Karaoguz et al. | |
| 2008/0133124 A1* | 6/2008 | Sarkeshik | 701/201 |
| 2009/0021641 A1* | 1/2009 | Matsuura et al. | 348/553 |
| 2009/0164547 A1 | 6/2009 | Ch'ng et al. | |
| 2009/0296641 A1* | 12/2009 | Bienas et al. | 370/329 |
| 2009/0311987 A1* | 12/2009 | Edge et al. | 455/404.1 |
| 2010/0112982 A1* | 5/2010 | Singh et al. | 455/411 |
| 2010/0208703 A1 | 8/2010 | Tinnakornsrisuphap et al. | |
| 2010/0255848 A1 | 10/2010 | Abraham et al. | |
| 2010/0285785 A1 | 11/2010 | Wang et al. | |
| 2011/0053609 A1* | 3/2011 | Choi-Grogan | 455/456.2 |
| 2011/0212729 A1 | 9/2011 | Li et al. | |

* cited by examiner

*Primary Examiner* — Yong Zhou

(57) ABSTRACT

A device associated with a Voice over IP (VoIP) network receives a call from a mobile device. The device determines whether a sector identifier (ID) associated with the call includes a femtocell identifier. The device further determines a location identifier included in the sector ID when the sector ID includes the femtocell identifier. The device also identifies a recipient of the call based on the location identifier and forwards the call to the recipient.

16 Claims, 8 Drawing Sheets

… (1)

FEMTOCELL LOCATION ENCODING

RELATED APPLICATIONS

This application claims priority from and is a continuation-in-part (CIP) of U.S. patent application Ser. No. 12/906,484, filed Oct. 18, 2010, entitled "BROADCASTING CONTENT," the entire disclosure of which is incorporated herein by reference.

BACKGROUND

Location-sensitive call routing is used to direct a particular call (e.g., an emergency telephone call (e.g., a 911 call), a directory assistance call (e.g., a 411 call), an information service call (e.g., a 311 call), etc.) to an appropriate operator that services a calling region that includes a location from where the particular call is placed. In wireless data networks, the physical network may include traditional wireless communication stations (macro cell base stations) installed at known fixed locations. Accordingly, a voice over Internet protocol (VoIP) network may forward a location-sensitive call made from a mobile device, via a macro cell base station, based on a known location of the macro cell base station. Another type of base station, called a femtocell, may also be used in such networks. A femtocell may be a small form factor wireless base station, typically designed for use in a home or small business. Femtocells do not have fixed known locations. As a result, a VoIP network is unable to forward a location-sensitive call made via a femtocell.

DETAILED DESCRIPTION OF PREFERRED EMBODIMENTS

The following detailed description refers to the accompanying drawings. The same reference numbers in different drawings may identify the same or similar elements.

The term message, as used herein, may refer to a signal, a frame, a datagram, a packet, or a cell; a fragment of a frame, a fragment of a datagram, a fragment of a packet, or a fragment of a cell; and/or another type, arrangement, or packaging of data. The term location, as used herein, may refer to a geographic location.

An implementation, described herein, may allow routing of location-sensitive calls from a mobile device via femtocells. A femtocell may determine its location. A mobile device may receive, from the femtocell, information about the location of the femtocell via a sector identifier (ID) or another unique wireless network session identifier. A VoIP network may forward a location-sensitive call placed by the mobile device, via the femtocell, to an appropriate operator based on the information about the location. The appropriate operator may handle calls from a limited geographic area that includes the location from where the call is placed.

Figure 1:
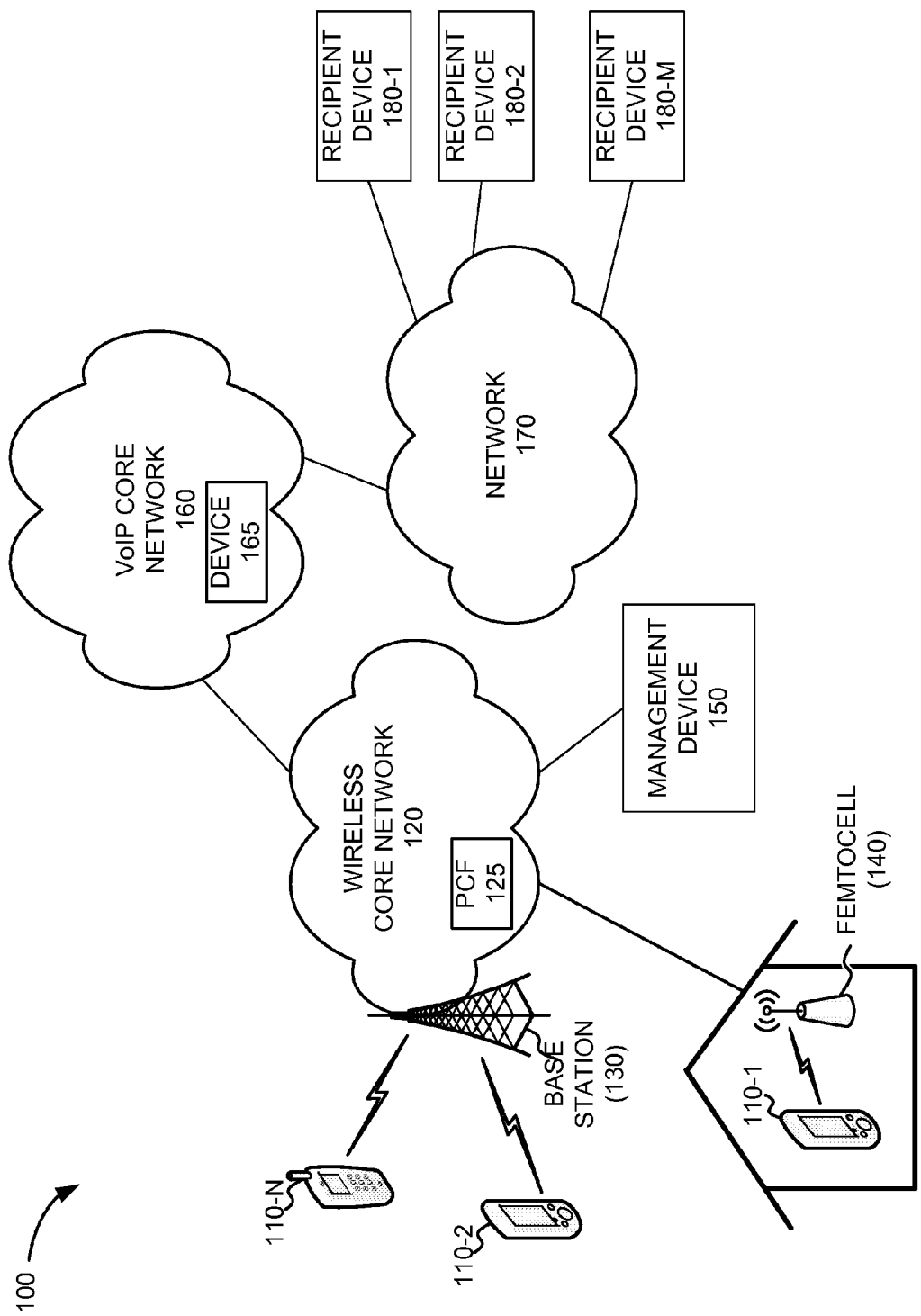
FIG. 1 is a diagram of an example environment in which systems and/or methods described herein may be implemented.

FIG. 1 is a diagram of an example environment 100 in which systems and/or methods described herein may be implemented. Environment 100 may generally illustrate a wireless communication system based on the Evolution-Data Optimized (EVDO) mobile communication standard. In alternative implementations, other communication standards may be used.

As shown in FIG. 1, environment 100 may include multiple mobile devices 110-1, 110-2, . . . , 110-N (referred to herein collectively as "mobile devices 110" or generically as "mobile device 110"); a wireless core network 120, including a packet control function (PCF) 125; a base station 130; a femtocell 140; a management device 150; a VoIP core network 160, including a VoIP device 165; a network 170; and multiple recipient devices 180-1, 180-2, . . . , 180-M (referred to herein collectively as "recipient devices 180" or generically as "recipient device 180"). Components of environment 100 may interconnect via wired and/or wireless connections. Three mobile devices 110, one wireless core network 120, one PCF 125, one base station 130, one femtocell 140, one management device 150, one VoIP core network 160, one VoIP device 165, one network 170, and three recipient devices 180 have been illustrated in FIG. 1 for simplicity. In practice, there may be more mobile devices 110, networks 120, PCFs 125, base stations 130, femtocells 140, management devices 150, VoIP core networks 160, VoIP devices 165, networks 170, and/or recipient devices 180.

Mobile device 110 may include any device capable of transmitting and receiving data (e.g., voice, text, images, and/or multimedia data) over wireless core network 120. For example, mobile device 110 may be a self-contained data device, such as a mobile telephone, a smart phone, an electronic notepad, a personal digital assistant (PDA), etc. In another implementation, mobile device 110 may be connected to a computing device, such as laptop or personal computer. Mobile devices 110 may establish wireless communication sessions with base stations 130 or femtocells 140 using identical protocols. The wireless communication sessions may be used for voice (e.g., telephone calls) or data sessions.

Wireless core network 120 may include components to implement a core network of the EVDO standard. One implementation of such a core network includes the Evolved Packet Core (EPC) architecture. In other implementations, other network technologies, such as fourth-generation wireless telephone technology ("4G"), other third generation network technology ("3G"), or second-generation wireless telephone technology ("2G"), may be implemented instead of or in addition to EVDO. Components within wireless core network 120 may generally be connected over wired or wireless IP-based connections.

PCF 125 may include an entity that manages the relay of packets between either base station 130 or femtocell 140 and another node within network 120, such as a packet data serving node (PDSN). Network 120 may include multiple PCFs 125. In one implementation, PCF 125 may assign, to mobile device 110, a unique session that is sent, via either base station 130 or femtocell 140, to mobile device 110. In another implementation, one PCF 125 can support multiple base stations 130 or femtocells 140. In yet another implementation, a separate PCF 125 may be used for each base station 130 and/or femtocell 140.

Base station 130 may represent a base station designed to provide wireless communication service (e.g., an access network) to a relatively large area and simultaneously serve a relatively large number of mobile devices 110. Base station 130 may also be referred to herein as a macro cell or a macro cell base station.

Femtocell 140 may include a device designed to be placed within a residence or small business setting and may connect to wireless core network 120 via a wired broadband connection. Femtocell 140 may act as a base station for a limited set of active mobile devices, such as up to four simultaneous mobile devices. In some instances, femtocell 140 may be self-installed by end-users in the residences or business of the end-users. Femtocell 140 may determine its location, as described further below. In one implementation, femtocell 140 may provide, to mobile device 110, an EVDO sector ID (herein, sector ID) that indicates that femtocell 140 is a femtocell and/or the location of femtocell 140. In another implementation, femtocell 140 may establish wireless communication sessions with mobile device 110 using the same protocols as that of base station 130.

Although mobile devices 110-2 through 110-N are shown in FIG. 1 as connecting to base station 130 and mobile device 110-1 is shown as connecting to femtocell 140, mobile devices 110 may generally connect to either base station 130 or femtocell 140 (e.g., depending on the location of each mobile device 110). In a typical implementation, mobile device 110 may connect to femtocell 140 when mobile device 110 is within range of femtocell 140. When mobile device 110 moves out of range of femtocell 140, mobile device 110 may switch the connection to base station 130, where the switch may be performed without interrupting the communication session of mobile device 110.

Management device 150 may include one or more server devices, or other types of computation or communication devices, that gather, process, search, and/or provide information in a manner described herein. In one implementation, management device 150 may receive and store information associated with femtocell 140 and/or one or more other femtocells. Management device 150 may receive, from femtocell 140, an identifier of femtocell 140. Management device 150 may determine a last known location of femtocell 140 based on the identifier. Management device 150 may transmit the last know location to femtocell 140. Thereafter, management device 150 may receive, from femtocell 140, location information associated with a current location of femtocell 140. The location information may include global positioning system (GPS) coordinates, a latitude and a longitude, and/or any other information that indicates the current location or geographical position of femtocell 140.

Management device 150 may determine, based on the location information, which cell towers (e.g., base station 130) are located within a particular range of femtocell 140 and which frequencies (e.g., frequency bands) femtocell 140 should use. In some implementations, management device 150 may determine, based on the location information, a location identifier (e.g., a Federal Information Processing Standard (FIPS) county code, a zip code, etc.). Management device 150 may transmit information about the cell towers and/or the frequencies and the location identifier to femtocell 140. Femtocell 140 may include the location identifier in a sector ID that is transmitted to mobile device 110, as described further below.

VoIP core network 160 may include components to implement VoIP. VoIP core network 160 may include a local area network (LAN), a wide area network (WAN), a metropolitan area network (MAN), an intranet, the Internet, an IP-based network, a VoIP-based network, a combination of networks, or a portion of one or more of the aforementioned networks. VoIP core network 160 may allow VoIP services that facilitate voice communications and multimedia sessions over VoIP core network 160. VoIP core network 160 may connect wireless core network 120 to network 170.

VoIP device 165 may include any device that facilitates voice communications via VoIP core network 160. In one implementation, VoIP device 165 may include a serving call session control functions (S-CSCFs) component, a telephony application server, and/or any other device that may facilitate a forwarding of a location-sensitive call from mobile device 110 to one of recipient devices 180.

Network 170 may include one or more wired and/or wireless networks. For example, network 170 may include a cellular network, a public land mobile network (PLMN), a second generation (2G) network, a third generation (3G) network, a fourth generation (4G) network, a fifth generation (5G) network, and/or one or more other networks. Additionally, or alternatively, network 170 may include a WAN, a MAN, a telephone network (e.g., the Public Switched Telephone Network (PSTN)), an ad hoc network, an intranet, the Internet, a fiber optic-based network (e.g., a FiOS network), and/or a combination of these or other types of networks. Network 170 may include wireless core network 120 and/or VoIP core network 160.

Recipient device 180 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a laptop, a personal computer, a VoIP-based device, or other types of computation or communication devices, threads or processes running on these devices, and/or objects executable by these devices. In one implementation, recipient device 180 may include a VoIP-based calling device that is capable of initiating and/or receiving a call to/from a VoIP subscriber (e.g., to/from mobile device 110 via VoIP device 165).

Figure 2:
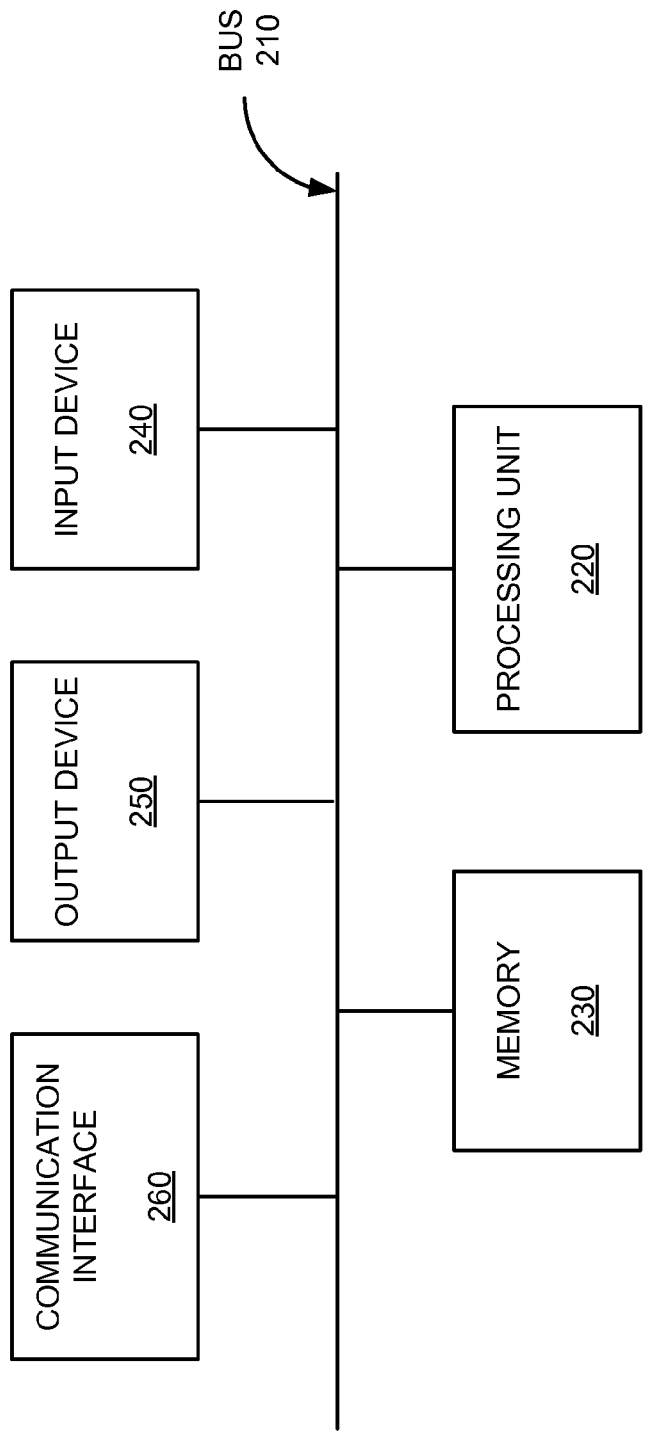
FIG. 2 is a diagram of example components of one or more devices of FIG. 1.

FIG. 2 is a diagram of example components of a device 200 that may correspond to one or more of PCF 125, base station 130, femtocell 140, management device 150, VoIP device 165, or recipient device 180. Each of PCF 125, base station 130, femtocell 140, management device 150, device 165, and/or recipient device 180 may include one or more devices 200. As shown, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, or the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described below, device 200 may perform certain operations. Device 200 may perform these operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
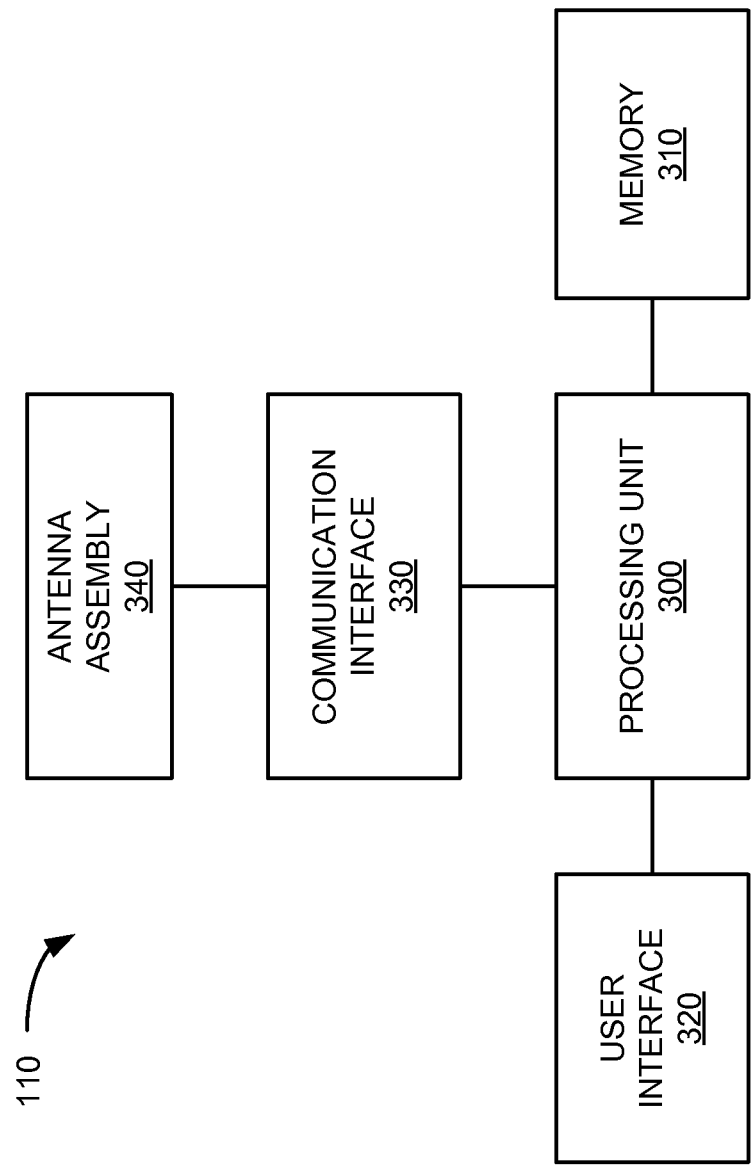
FIG. 3 is a diagram of example components of a mobile device of FIG. 1.

FIG. 3 is a diagram of example components of mobile device 110. As shown, mobile device 110 may include a processing unit 300, a memory 310, a user interface 320, a communication interface 330, and/or an antenna assembly 340.

Processing unit 300 may include one or more processors, microprocessors, ASICs, FPGAs, or the like. Processing unit 300 may control operation of mobile device 110 and its components. In one implementation, processing unit 300 may control operation of components of mobile device 110 in a manner described herein.

Memory 310 may include a random access memory (RAM), a read-only memory (ROM), and/or another type of memory to store data and instructions that may be used by processing unit 300.

User interface 320 may include mechanisms for inputting information to mobile device 110 and/or for outputting information from mobile device 110. Examples of input and output mechanisms might include buttons (e.g., control buttons, keys of a keypad, a joystick, etc.) or a touch screen interface to permit data and control commands to be input into mobile device 110; a speaker to receive electrical signals and output audio signals; a microphone to receive audio signals and output electrical signals; and/or a display to output visual information (e.g., text input into mobile device 110).

Communication interface 330 may include, for example, a transmitter that may convert baseband signals from processing unit 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate, via antenna assembly 340, with a network and/or devices connected to a network (e.g., network 120).

As described below, mobile device 110 may perform certain operations. Mobile device 110 may perform these operations in response to processing unit 300 executing software instructions of an application contained in a computer-readable medium, such as memory 310. The software instructions may be read into memory 310 from another computer-readable medium or from another device via communication interface 330. The software instructions contained in memory 310 may cause processing unit 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of mobile device 110, in other implementations, mobile device 110 may contain fewer components, different components, differently arranged components, or additional components than depicted in FIG. 3. In still other implementations, one or more components of mobile device 110 may perform one or more other tasks described as being performed by one or more other components of mobile device 110.

Figure 4:
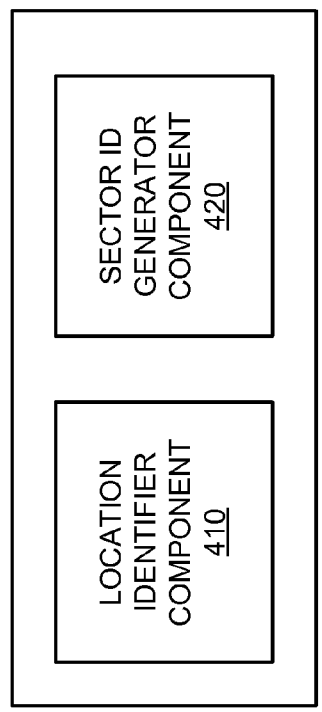
FIG. 4 is a diagram of example functional components of a femtocell depicted in FIG. 1.

FIG. 4 is a diagram of example functional components of femtocell 140. In one implementation, the functions described in connection with FIG. 4 may be performed by one or more components of device 200 (FIG. 2). As shown in FIG. 4, femtocell 140 may include a location identifier component 410 and a sector ID generator component 420.

Location identifier component 410 may include hardware or a combination of hardware and software to determine a location of femtocell 140. Location identifier component 410 may transmit an identifier associated with femtocell 140 to management device 150. Location identifier component 410 may receive, from management device 150, a last known location in response to the identifier. Location identifier component 410 may use assisted GPS (AGPS) and/or other techniques to determine location information about a current location of femtocell 140 based on the last known location and a current time.

Location identifier component 410 may transmit the location information to management device 150. In response, location identifier component 410 may receive, from management device 150, information about cell towers (e.g., base station 130) that are located within a particular range of femtocell 140 and frequencies (e.g., frequency bands) which femtocell 140 should use to transmit signals, messages, and/or packets. Femtocell 140 may verify that the cell towers are located within the particular range of femtocell 140 before broadcasting sector ID signals, as described further below. In one implementation, location identifier component 410 may also receive, from management device 150, a location identifier associated with the current location. In another implementation, location identifier component 410 may determine the location identifier based on the location information.

Sector ID generator component 420 may include hardware or a combination of hardware and software to assign a sector ID that includes a femtocell identifier and the location identifier. Femtocell 140 may broadcast the sector ID to mobile device 110 when mobile device 110 crosses a subnet of femtocell 140 (e.g., the footprint of an access network defined by the range of femtocell 140). While implementations described herein are primarily described in the context of a sector ID, in other implementations, another unique wireless network session identifier may be used.

The sector ID may include a femtocell identifier and the location identifier. In one implementation, the femtocell identifier may be a two-bit value common to all femtocell identifiers within a service provider's network. The femtocell identifier may be included within a particular portion of the sector ID so that mobile device 110 may detect the femtocell identifier and, for example, so that VoIP device 165 may determine that a call is made from mobile device 110 via a femtocell. The location identifier may be a value that identifies the current location of femtocell 140. The location identifier may be included within a different portion of the sector ID so that, for example, VoIP device 165 may forward a location-sensitive call to an appropriate recipient device 180 that is associated with the current location.

Although FIG. 4 shows example functional components of femtocell 140, in other implementations, femtocell 140 may include different functional components, differently arranged functional components, and/or additional functional components than depicted in FIG. 4.

Figure 5:
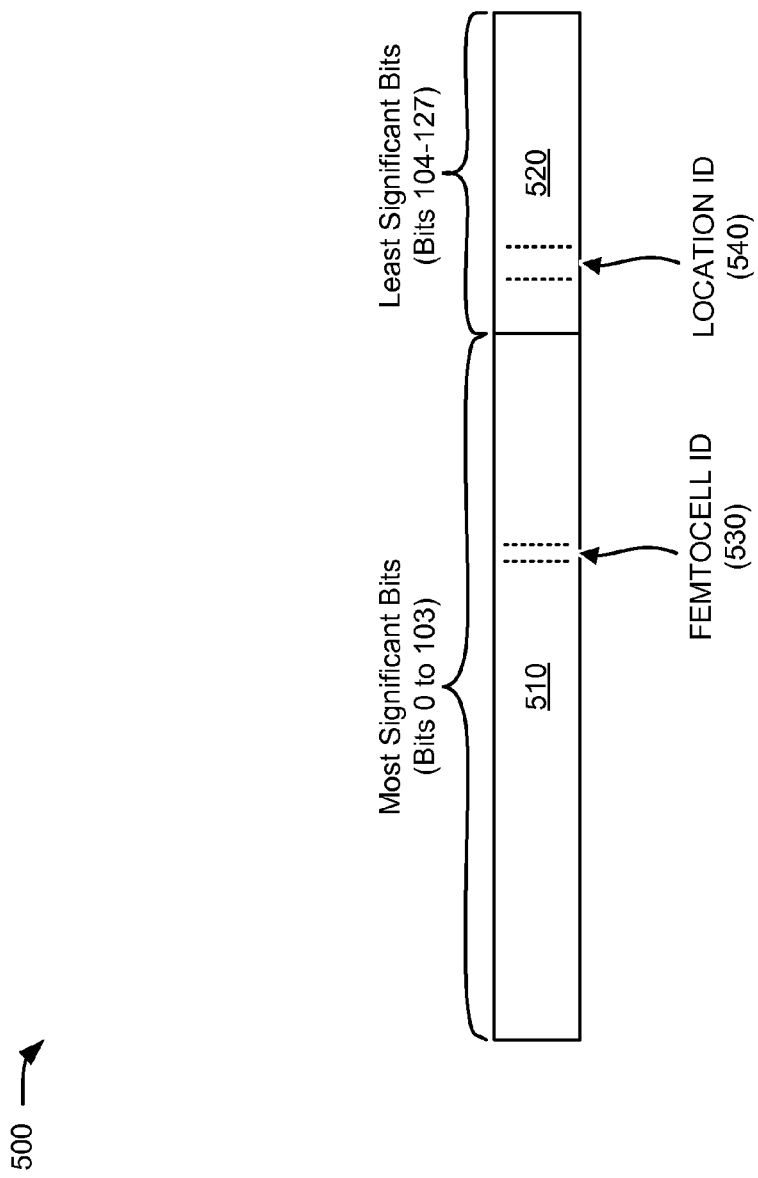
FIG. 5 is a diagram of an example format for a sector identifier (ID)

FIG. 5 depicts an example sector ID format 500 according to an implementation described herein. Sector ID format 500 may include a most significant bits (MSB) section 510 and a least significant bits (LSB) section 520. MSB section 510 may include, for example, a femtocell identifier (ID) section 530. LSB section 520 may include, for example, a location ID section 540.

MSB section 510 may include "n" most significant bits (MSBs) that represent the identifier for a subnet. In one example, MSB section 510 may include 104 bits (e.g., bit numbers 0-103). Least significant bits (LSB) section 520 may include the remaining "128-n" bits that identify a particular sector/device within a subnet. For example, LSB section 520 may include 24 bits (e.g., bit numbers 104-127).

Femtocell ID section 530 may be a particular number and location of bits designated for identifying femtocell use. In one example, femtocell ID section 530 may include bits 48 and 49 as dedicated femtocell indicator bits. For example, all femtocells may use the same predefined two-bit pattern (e.g., "11") in femtocell ID section 530 to uniquely identify themselves as femtocells. Thus, a sector ID provided to mobile device 110, from femtocell 140, may include the predefined two-bit pattern in femtocell ID section 530. Conversely, an identifier provided to mobile device 110, from base station 130, may include a different bit or set of bits in femtocell ID section 530.

Location ID section 540 may be a particular number and location of bits designated for identifying a location of femtocell 140. In one implementation, location ID section 540 may include any portion of LSB section 520 (e.g., bits 106-111) as dedicated location bits. Location ID section 540 may include a bit pattern that identifies the location (e.g., Essex County, N.J.). The bit pattern may include a value that is equal to a value of a FIPS county code (e.g., 34013), a zip code (e.g., 07039), a local access and transport area (LATA) code (e.g., 224), an area code (e.g., 973), and/or any other value that identifies the location. Thus, a sector ID provided to mobile device 110, from femtocell 140, may include the bit pattern in location ID section 540.

Although FIG. 5 shows an example sector ID format 500, in other implementations, sector ID format 500 may include fewer sections, different sections, differently arranged sections, and/or additional sections than depicted in FIG. 5. For example, in another implementation, location ID section 540 may include any portion of MSB section 510 (e.g., bits 99-103) as dedicated location bits except the portion (e.g., femtocell ID section 530) of MSB section 510 that is used for dedicated femtocell indicator bits.

Figure 6:
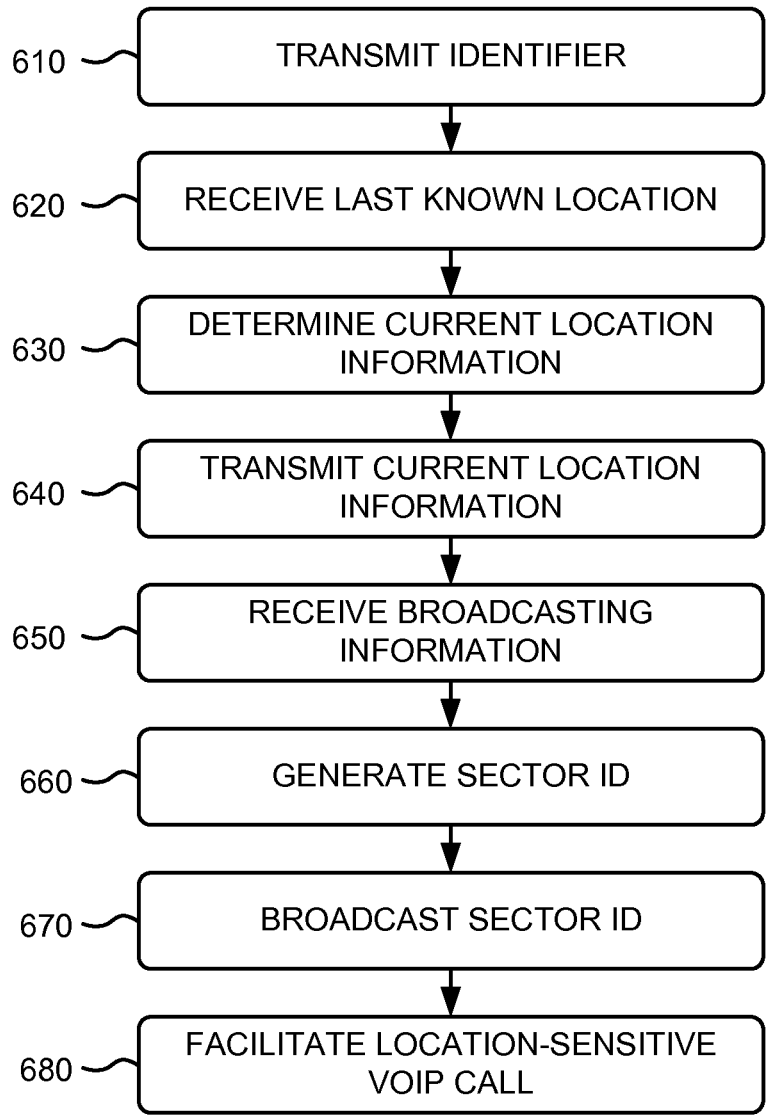
FIG. 6 is a flowchart of an example process for facilitating a location-sensitive call via a femtocell.

FIG. 6 is a flowchart of an example process 600 for facilitating a location-sensitive call via a femtocell. In one example implementation, femtocell 140 may perform process 600. Alternatively, process 600 may be performed by one or more other devices, alone or in combination with femtocell 140.

As shown in FIG. 6, process 600 may include transmitting an identifier to a device (block 610) and receiving, from the device, a last known location of a femtocell (block 620). For example, a user may turn on femtocell 140. After femtocell 140 completes initialization, femtocell 140 may transmit, to management device 150, an identifier associated with femtocell 140. Management device 150 may retrieve a last known location of femtocell 140 based on the identifier. Management device 150 may transmit, to femtocell 140, the last known location of femtocell 140. Femtocell 140 may receive the last known location of femtocell 140.

Process 600 may further include determining current location information associated with the femtocell (block 630) and transmitting the current location information to the device (block 640). For example, after receiving the last known location of femtocell 140, femtocell 140 may determine a current time. Femtocell 140 may use AGPS to determine current location information based on the last known location of femtocell 140 and the current time. The current location information may include GPS coordinates that indicate a current location of femtocell 140. Femtocell 140 may transmit, to management device 150, the current location information.

Process 600 may also include receiving broadcasting information from the device (block 650). For example, management device 150 may update the last known location of femtocell 140 based on the current location information. Management device 150 may also determine broadcasting information based on the current location information. The broadcasting information may include information about cell towers (e.g., base station 130) that are located within a particular range of femtocell 140; information about carrier spectrums that a mobile phone carrier, associated with management device 150 and wireless core network 120, owns in an area that includes the current location of femtocell 140; and/or frequencies that femtocell 140 should use to broadcast signals to mobile devices 110. In one implementation, the broadcasting information may also include a location identifier associated with the current location. In another implementation, femtocell 140 may determine the location identifier. Management device 150 may transmit the broadcasting information to femtocell 140. Femtocell 140 may receive the broadcasting information.

Process 600 may also include generating a sector ID (block 660) and broadcasting the sector ID (block 670). For example, femtocell 140 may verify an existence of the cell towers specified in the broadcasting information. After verifying the existence of the cell towers, femtocell 140 may generate a sector ID by using, for example, sector ID format 500 (FIG. 5). Femtocell 140 may include/encode a femtocell identifier (e.g., 11) in femtocell ID section 530 of the sector ID. Femtocell 140 may further include/encode the location identifier in location identifier section 540. When mobile device 110 is within a particular range of femtocell 140, mobile device 110 may select to use femtocell 140. After mobile device 110 selects femtocell 140, femtocell 140 may broadcast the sector ID to mobile device 110. In one implementation, femtocell 140 my broadcast the sector ID by using frequencies specified in the broadcast information.

Process 600 may also include facilitating a location-sensitive VoIP call (block 680). For example, a user of mobile device 110 may use mobile device 110 to place a location sensitive VoIP call, such as, for example, by entering a phone number (e.g., 411, 911, etc.) associated with a particular type of location-sensitive call. Mobile device 110 may generate a VoIP signaling message to place the call. Mobile device 110 may include the sector ID in a VoIP signaling header of the VoIP signaling message. The VoIP signaling message may also include a phone number associated with the call. Mobile device 110 may transmit the VoIP signaling message with the VoIP signaling header, via femtocell 140 (i.e., femtocell 140 may forward the VoIP signaling message), to VoIP device 165 in order to establish a connection for the call.

Figure 7:
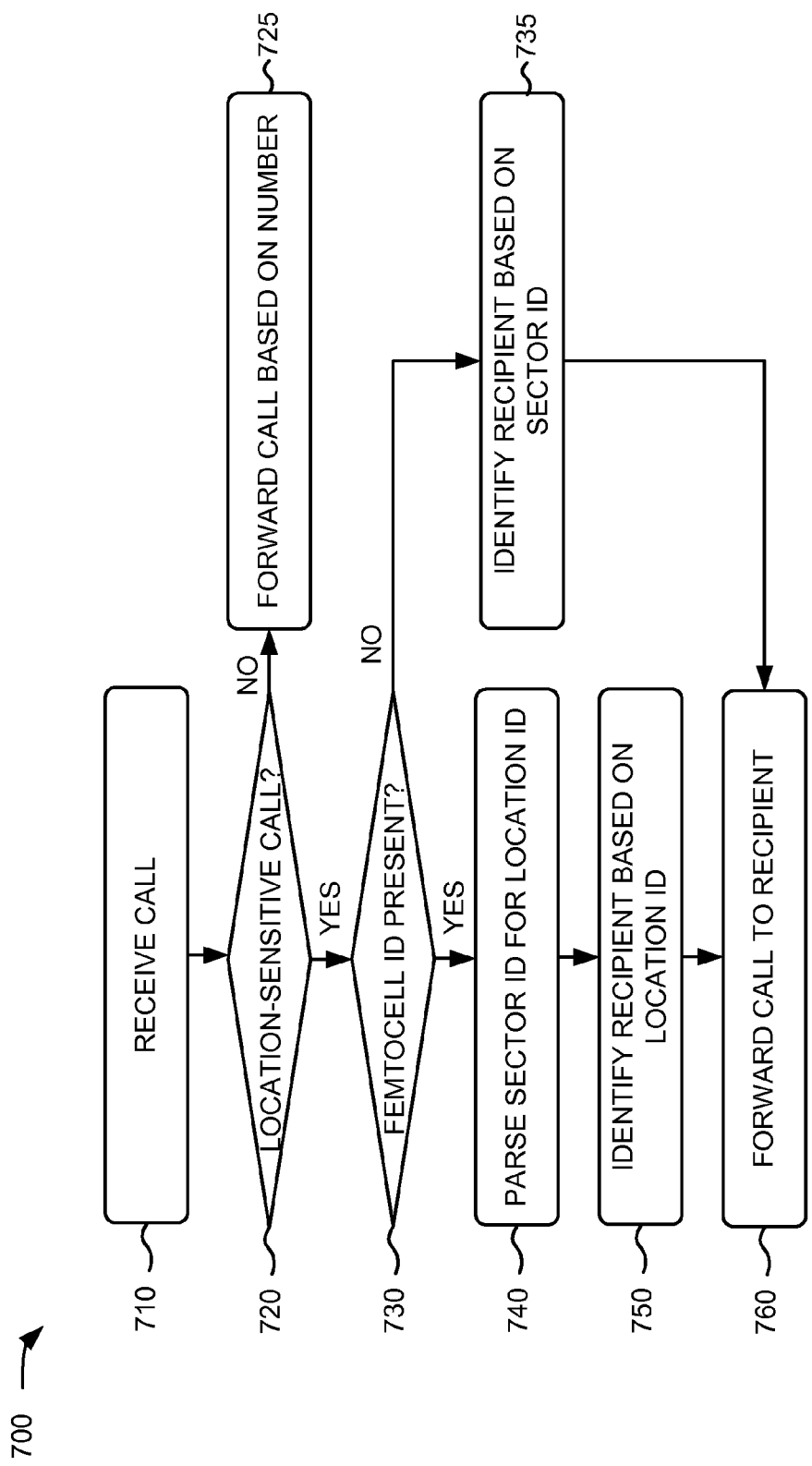
FIG. 7 is a flowchart of an example process for forwarding a location-sensitive call.

FIG. 7 is a flowchart of an example process 700 for forwarding a location-sensitive call. In one example implementation, VoIP device 165 may perform process 700. Alternatively, process 700 may be performed by one or more other devices, alone or in combination with VoIP device 165.

As shown in FIG. 7, process 700 may include receiving a call (block 710) and determining whether the call is location-sensitive (block 720). For example, VoIP device 165 may receive a call (e.g., a VoIP signaling message) from mobile device 110. VoIP device 165 may determine, based on a dialed phone number for the call, whether the call is location-sensitive. The VoIP signaling message associated with the call may include the phone number. In one implementation, VoIP device 165 may store or have access to a list of location sensitive phone numbers (e.g., 411, 911, 311, etc.) that are associated with different location-sensitive types of calls.

If the call is not location-sensitive (block 720-NO), process 700 may further include forwarding the call based on a phone number (block 725). For example, VoIP device 165 may determine that the call is not a location-sensitive call when the phone number (e.g., 908-259-1246) is not on the list of location-sensitive phone numbers. When VoIP device 165 determines that the call is not location-sensitive, VoIP device 165 may forward the call to a particular recipient (e.g., home phone of John Smith) associated with the phone number.

If the call is location-sensitive (block 720-YES), process 700 may further include determining whether a femtocell ID is present (block 730). For example, VoIP device 165 may determine that the call is location-sensitive when the phone number (e.g., 411) is on the list of location-sensitive phone numbers. When VoIP device 165 determines that the call is location sensitive, VoIP device 165 may determine whether a femtocell ID is present in a sector ID, included in a VoIP signaling header of the VoIP signaling message, associated with the call.

If the femtocell ID is not present (block 730-NO), process 700 may include identifying a recipient based on the sector ID (block 735). For example, VoIP device 165 may determine that the femtocell ID is not present when the sector ID does not include a particular femtocell identifier (e.g., a two-bit identifier in femtocell identifier section 530). When VoIP device 165 determines that the femtocell ID is not present, VoIP device 165 may determine that the call was received via base station 130 (and not via femtocell 140). The sector ID may uniquely identify base station 130. VoIP device 165 may store or have access to a reference table that identifies which recipients are associated with which sector IDs, of base stations, for particular types of location-sensitive calls. Accordingly, VoIP device 165 may use the reference table to identify a recipient (e.g., recipient device 180-2) of the call based on the sector ID.

If the femtocell ID is present (block 730-YES), process 700 may include parsing the sector ID for a location ID (block 740) and determining a recipient based on the location ID (block 750). For example, VoIP device 165 may determine that the femtocell ID is present when the sector ID includes the particular femtocell identifier. When VoIP device 165 determines that the femtocell ID is present, VoIP device 165 may parse the sector ID to detect a location ID (included, for example, in location ID section 540). VoIP device 165 may identify an appropriate recipient for the location-sensitive call based on the location ID and the phone number, included in the VoIP signaling message, associated with the call. For example, the location ID may include a FIPS county code (e.g. 34013) that identifies Essex County, N.J. VoIP device 165 may identify recipient device 180-2 based on the FIPS county code and the phone number (e.g., 411). The operator(s) that uses recipient device 180-2 may provide a particular service (e.g., directory assistance) associated with the number (e.g., 411) for callers from Essex County, N.J.

Process 700 may also include forwarding the call to the recipient (block 760). For example, after identifying recipient device 180-2 based on the sector ID or based on the location ID, VoIP device 165 may forward the call to recipient device 180-2. Thereafter, a connection may be established between mobile device 110 and recipient device 180-2. The operator of recipient device 180-2 may assist the user of mobile device 110.

Figure 8:
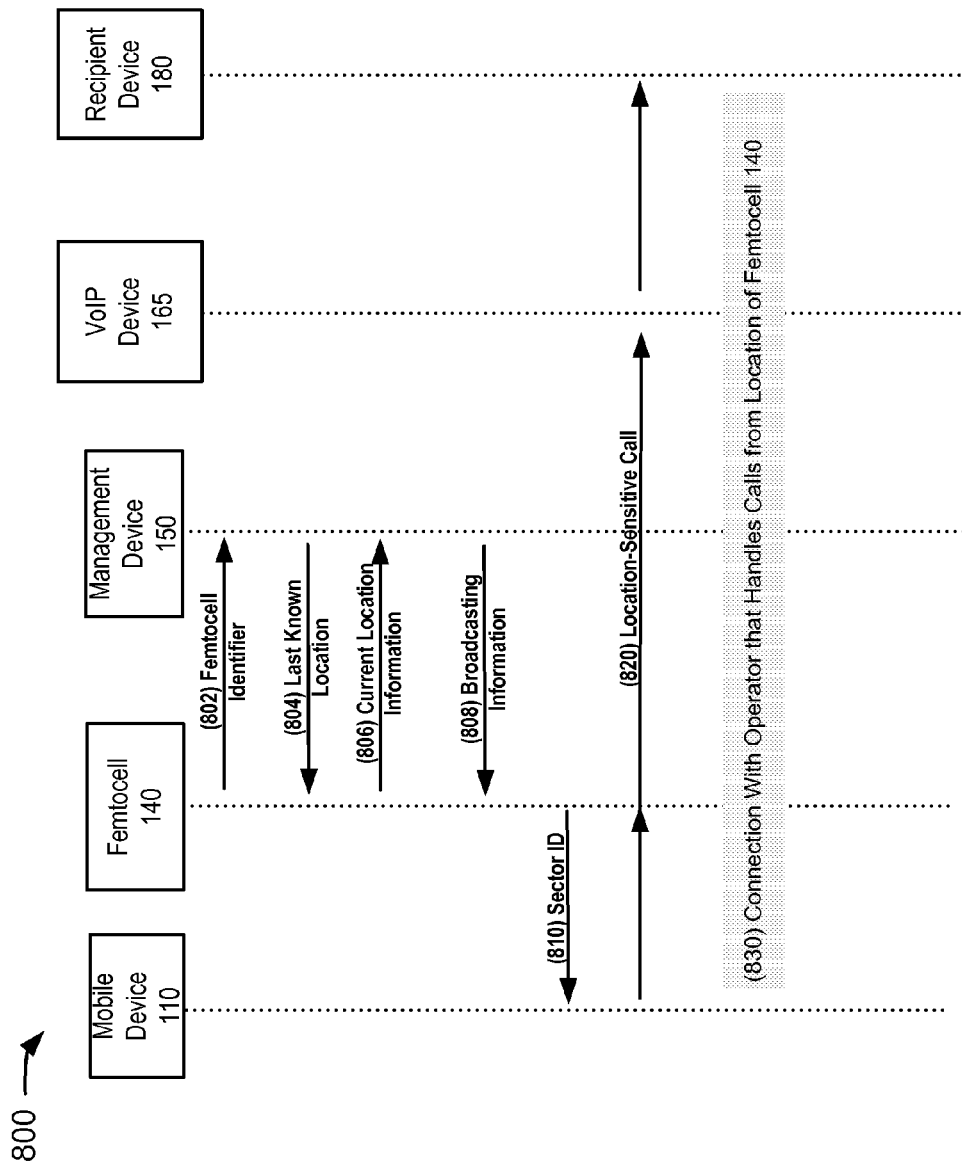
FIG. 8 is a flow diagram of an example of routing a location-sensitive call from a mobile device via a femtocell.

FIG. 8 is a flow diagram 800 of an example of routing a location-sensitive call from a mobile device via a femtocell. For example, assume that a network administrator sets up femtocell 140 in a business located in Essex County, N.J. As shown in FIG. 8, femtocell 140 may transmit a femtocell identifier 802, of femtocell 140, to management device 150. Management device 150 may determine a last known location 804 based on femtocell identifier 802. Management device 150 may transmit last known location 804 to femtocell 140. Femtocell 140 may determine current location information 806 (e.g., GPS coordinates, latitude and longitude, etc.), associated with a current location (e.g., Essex County, N.J.) of femtocell 140, based on last known location 804 and a current time. Femtocell 140 may transmit current location information 806 to management device 150. Management device 150 may determine broadcasting information 808 based on current location information 806. Broadcasting information 808 may include a location identifier (e.g., FIPS county code 34013) associated with the current location of femtocell 140.

Management device 150 may transmit broadcasting information 808 to femtocell 140. Femtocell 140 may receive broadcasting information 808. Femtocell 140 may generate sector ID 810 based on the location identifier. Sector ID 810 may include a femtocell identifier that indicates that femtocell 140 is a femtocell, and may also include the location identifier.

Assume that a user of mobile device 110 enters the business located in Essex County, N.J. Mobile device 110 may select to use femtocell 140 when mobile device 110 is within a particular range of femtocell 140. After mobile device 110 selects femtocell 140, femtocell 140 may transmit sector ID 810 to mobile device 110. While at the business, assume that the user observes an event that requires emergency assistance.

Further assume that the user uses mobile device 110 to dial a phone number (e.g., 911) to make a location-sensitive call 820 in order to receive the emergency assistance. Mobile device 110 may generate a VoIP signaling message to place location-sensitive call 820. The VoIP signaling message may include a VoIP signaling header that includes sector ID 810. The VoIP signaling message may also include the phone number. Mobile device 110 may transmit the VoIP signaling message, via femtocell 140, to VoIP device 165 to place location-sensitive call 820.

VoIP device 165 may determine that location-sensitive call 820 is location-sensitive based on the phone number (e.g., 911). VoIP device 165 may further determine that location-sensitive call 820 is placed via femtocell 140 based on the femtocell identifier included in sector ID 810. VoIP device 165 may parse sector ID 810 to determine the location identifier associated with femtocell 140.

Assume that recipient device 180-2 receives calls at an emergency dispatch center that provides assistance to users who call from within Essex County, N.J. VoIP device 165 may identify, based on the location identifier, recipient device 180-2. VoIP device 165 may forward location-sensitive call 820 to recipient device 180-2. A connection 830 may be established between an operator of recipient device 180-2, who handles calls from current location of femtocell 140, and the user of mobile device 110. The user of mobile device 110 may use connection 830 to provide information about the event that requires emergency assistance.

The foregoing description of implementations provides illustration and description, but is not intended to be exhaustive or to limit the invention to the precise form disclosed. Modifications and variations are possible in light of the above teachings or may be acquired from practice.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a device associated with a Voice over IP (VoIP) network, a call from a mobile device;
   determining whether the call is location-sensitive based on a phone number associated with the call;
   determining, by the device, whether a sector identifier associated with the call includes a femtocell identifier in response to determining that the call is location-sensitive;
   in response to determining that the sector identifier includes the femtocell identifier,
      detecting, by the device, a location identifier included in the sector identifier,
      identifying, by the device, a first recipient of the call based on the location identifier, and
      forwarding, by the device, the call to the first recipient;
   in response to determining that the sector identifier does not include the femtocell identifier,
      identifying a second recipient of the call based on the sector identifier, and
      forwarding, by the device, the call to the second recipient,
   wherein the device receives the call via a base station, and the sector identifier includes information identifying the base station associated with the second recipient of the call.

2. The method of claim 1, where the sector identifier comprises dedicated location identifier bits for the location identifier.

3. The method of claim 1, where the location identifier is one of:
   a Federal Information Processing Standard (FIPS) county code,
   a zip code,
   a local access and transport area (LATA) code, or
   an area code.

4. The method of claim 1,
   where the device receives the call via a femtocell in response to determining that the sector identifier includes the femtocell identifier, and
   where the location identifier indicates a current location of the femtocell.

5. The method of claim 1,
   where the recipient comprises a telephone device of an operator that handles calls from an area that includes a location from where the call is placed.

6. A device comprising:
   a memory to store a plurality of instructions; and
   a processor to execute the instructions in the memory to:
      provide a femtocell identifier in a sector identifier, where the femtocell identifier indicates that the device is a femtocell,
      provide a location identifier in the sector identifier, where the location identifier indicates a current location of the device,
      broadcast the sector identifier to a mobile device,
      transmit, to a management device, an identifier of the device,
      receive, from the management device, a last known location of the device,
      determine a current time,
      determine current location information for the device based on the last known location and the current time, and determine the location identifier based on the current location information.

7. The device of claim 6, where, when broadcasting the sector identifier, the processor is further to execute instructions to:
transmit the sector identifier to the mobile device when the mobile device is within a particular range of the device and the mobile device selects the device.

8. The device of claim 6, where the location identifier is one of:
a Federal Information Processing Standard (FIPS) county code of a county that includes the current location, or
a zip code of an area that includes the current location.

9. The device of claim 6, where the processor is further to execute instructions to:
determine global positioning system (GPS) coordinates of the device, and
determine the location identifier based on the GPS coordinates.

10. The device of claim 9, where, when determining the location identifier, the processor is further to execute instructions to:
transmit, to the management device, the GPS coordinates, and
receive, from the management device, the location identifier.

11. The device of claim 6, where the sector identifier includes:
dedicated femtocell indicator bits for the femtocell identifier, and
dedicated location indicator bits for the location identifier.

12. The device of claim 6,
where the processor is further to execute instructions to:
transmit the current location information to the management device, and
receive broadcasting information from the management device, and
where the broadcasting information comprises one or more of:
the location identifier,
information about cell towers located within a particular range of the device, or
information about frequencies for the device to use.

13. One or more non-transitory computer-readable media storing instructions executable by one or more processors of a computing device, the media storing one or more instructions of:
receiving a call from a mobile device;
determining whether the call is location-sensitive based on a phone number associated with the call;
determining whether a femtocell identifier is present in a sector identifier associated with the call in response to determining that the call is location-sensitive;
parsing the sector identifier for a location identifier in response to determining that the femtocell identifier is present in the sector identifier;
establishing a connection, for the call, between the mobile device and a first recipient device based on the location identifier in response to determining that the femtocell identifier is present in the sector identifier; and
establishing a connection, for the call, between the mobile device and a second recipient device based on the sector identifier in response to determining that the femtocell identifier is not present in the sector identifier.

14. The media of claim 13, where establishing the connection between the mobile device and the first recipient device in response to determining that the femtocell identifier is present in the sector identifier comprises:
identifying the first recipient device based on the location identifier, and
forwarding the call to the first recipient device.

15. The media of claim 13, where the first recipient device comprises a telephone device of an operator that handles calls from a location associated with the location identifier.

16. The media of claim 13, where the location identifier indicates a current location of a femtocell that generated the sector identifier.

* * * * *